Feb. 10, 1942.    W. P. LEAR    2,272,213
ANTENNA REELING SYSTEM
Filed Sept. 27, 1939    4 Sheets-Sheet 1

INVENTOR.
WILLIAM P. LEAR
BY Richard A. Marsen
ATTORNEY.

Feb. 10, 1942.    W. P. LEAR    2,272,213
ANTENNA REELING SYSTEM
Filed Sept. 27, 1939    4 Sheets-Sheet 2

Fig. 2

INVENTOR.
WILLIAM P. LEAR
BY Richard O. Marsen
ATTORNEY.

Feb. 10, 1942.    W. P. LEAR    2,272,213
ANTENNA REELING SYSTEM
Filed Sept. 27, 1939    4 Sheets-Sheet 3
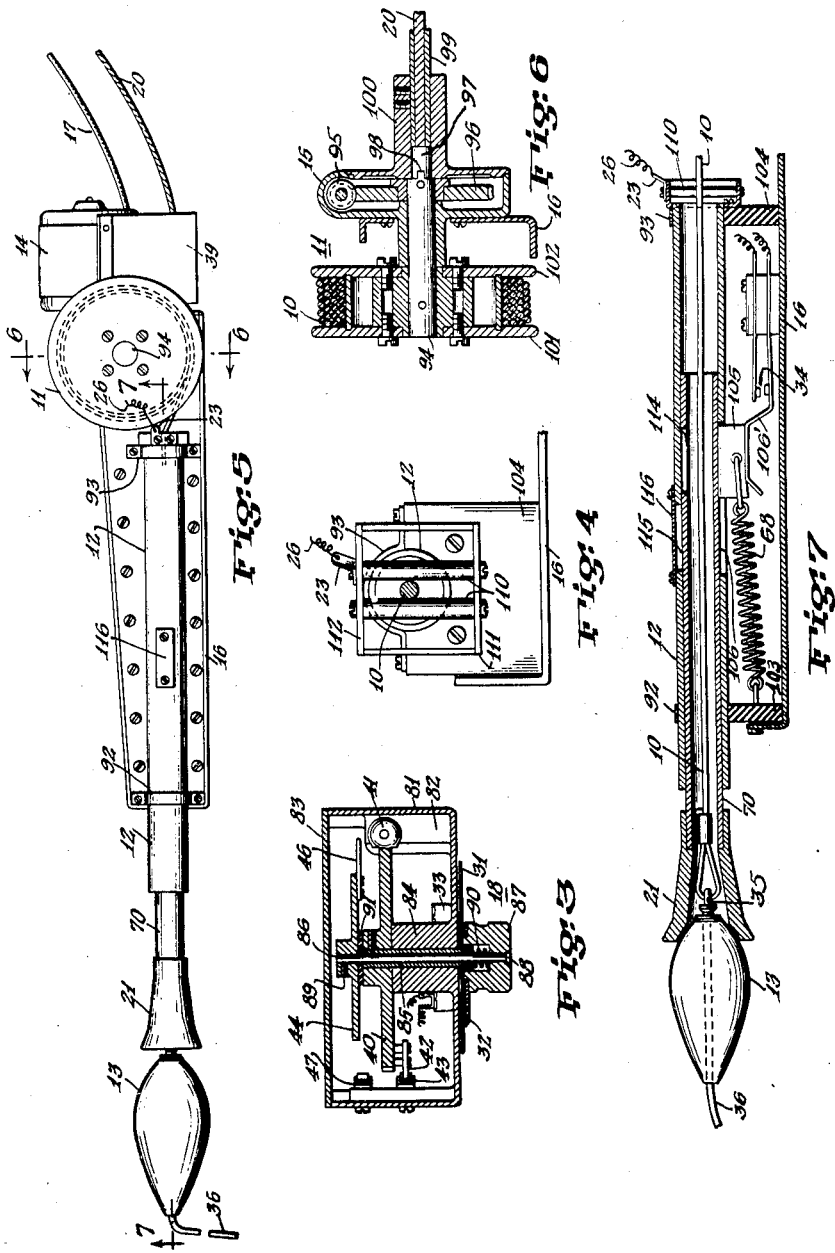
INVENTOR.
WILLIAM P. LEAR
BY
Richard A. Marsen
ATTORNEY.

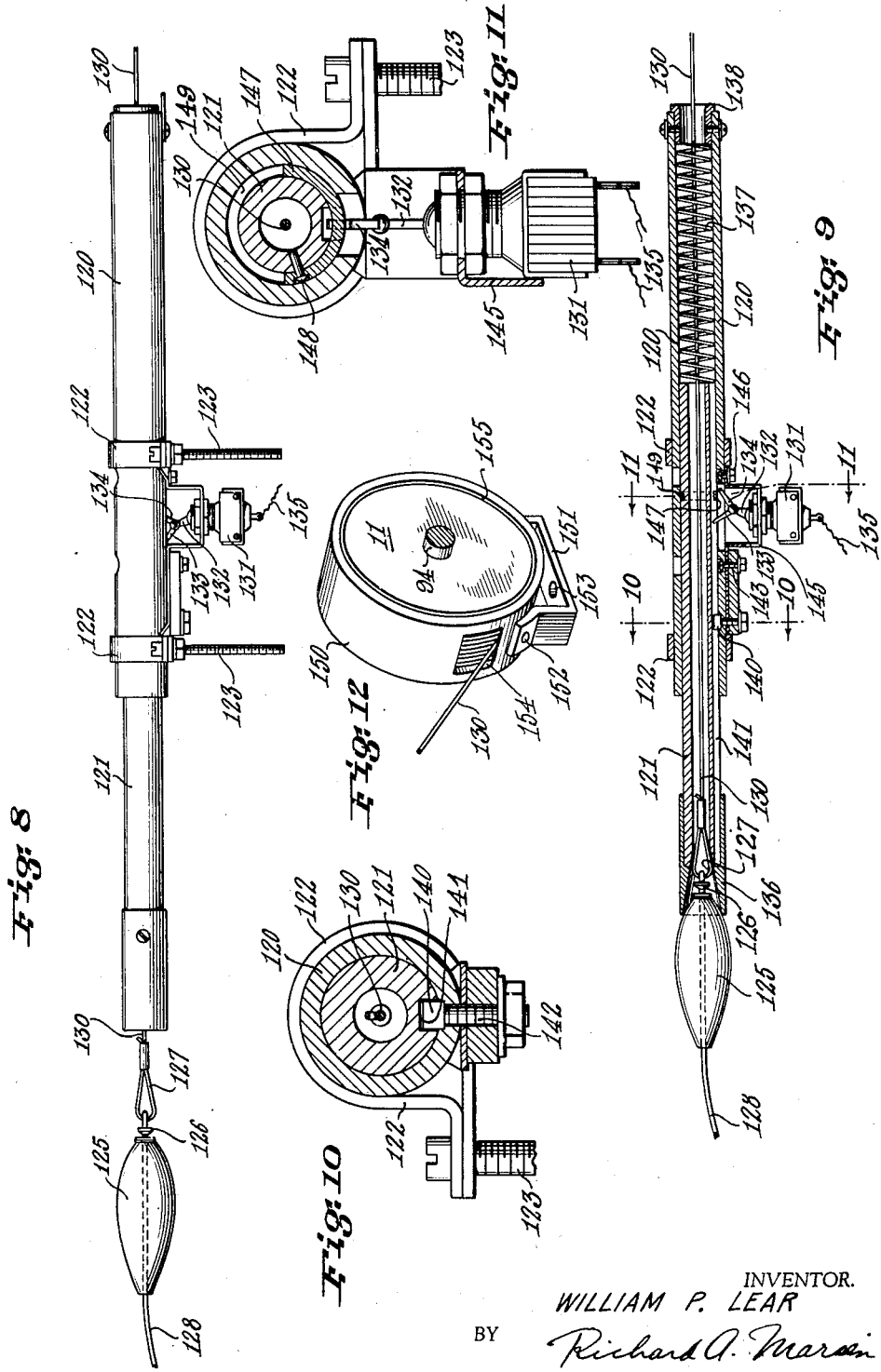

Patented Feb. 10, 1942

2,272,213

UNITED STATES PATENT OFFICE 2,272,213

ANTENNA REELING SYSTEM

William P. Lear, Dayton, Ohio, assignor, by mesne assignments, to Lear Avia, Inc., Piqua, Ohio Application September 27, 1939, Serial No. 296,725

20 Claims. (Cl. 250—33)

This invention relates to remote control reeling systems, and more particularly relates to novel reeling arrangements for trailing aircraft radio antennae.

A trailing wire is the most efficient antenna for a radio transmitter of an aircraft in flight. A one-quarter wave length antenna is the most efficient length for such trailing antenna wire, the high potential then being at its trailing end giving a marked radiation efficiency. Each frequency of transmission has its own optimum antenna length.

In accordance with the present invention, I provide remotely controlled mechanism for extending a trailing wire antenna in predetermined amounts corresponding to the frequency of radio transmission. The pilot need merely set a pointer opposite the proper indication on a control panel to cause an exact predetermined length to be extended. Thus a maximum communication range is assured for a given transmitter power, and conversely, a minimum size transmitter is required for a given radio transmission range.

The presence of an extended trailing antenna wire during landing and take-off maneuvers is rather dangerous. It has heretofore been necessary at such times for the pilot to watch out for and effect retraction of any trailing wire. In accordance with my present invention I provide automatic means controlled by the velocity of the aircraft which prevents the extension of a trailing wire prior to take-off or until the aircraft attains a minimum predetermined velocity. The invention furthermore is adapted to automatically retract any extended wire when the aircraft falls below a predetermined minimum speed prior to landing. The pilot is this way not concerned about dangerously dangling wires during low flight speed or altitude.

In carrying out my present invention I employ a novel retractable fairlead for the wire antenna with two coacting sections mechanically biased apart in a manner to prevent snapping of the trailing wire, to keep it taut and to prevent its rattling after reeling in. A safety switch is also incorporated with the retractable fairlead arranged to automatically deenergize the control motor circuit at the proper time to prevent breakage of the antenna wire upon reeling in. I further provide a novel auxiliary antenna arrangement projecting beyond the main antenna, insuring continuous radio communication with the local airport after the main antenna is retracted.

The remote reel and associated driving arrangement is assembled in a novel unitary construction. The unitary assembly is placed adjacent the portion of the aircraft through which the wire antenna projects. It is designed for compactness and with a minimum bulk and weight. A novel safety casing is incorporated with the antenna wire reel to protect adjacent sections of the aircraft from damage should the antenna wire for any reason snap. The casing prevents whirling about of the wire. A novel remote control unit is electrically and mechanically interrelated with the reeling mechanism, and is arranged to insure extension and retraction of predetermined lengths of the antenna wire in accordance with settings made on a calibrated dial of the control panel. Switches within the control unit correlate the dial settings with the amount of wire extended, effecting a positive remote control action on the reel motor drive.

The novel vehicle velocity responsive switching means of my present invention may be employed to initiate other functions beside those of antenna reeling. Thus, for example, when the speed of an aircraft falls below a predetermined value, such as 70 miles per hour, many of the operations which the pilot is normally called upon to then perform may be automatically controlled by such switch. The "velocity switch" is, in the preferred embodiment, made responsive to an air pressure developed by the Pitot tube usually present and connected with other aircraft instruments or separately provided. The switch is electrically related with relays or other means to function in the required manner. Landing gear or flap signal warnings may be actuated by the "velocity switch" when the speed of the aircraft requires it, reminding the pilot of operations necessary at the time. Predetermined automatic operation of the landing gear, flaps, antenna reel, or other aircraft components may be arranged with such switch when the aircraft reaches, or falls below, a predetermined speed.

It is accordingly an object of my present invention to provide a novel method of and means for automatically performing mechanical, electrical, or other operations or functions upon an aircraft or other high-speed vehicle when its velocity falls below or rises above a predetermined value.

Another object of my present invention is to provide a novel method of and means for remotely controlling a reeling mechanism.

Still another object of the invention provides a novel apparatus for remotely controlling the extension and retraction of a trailing wire antenna aboard a high-speed vehicle such as an aircraft.

A further object of the invention is to provide a novel method of and means for automatically retracting an extended wire antenna aboard an aircraft when its velocity falls below a predetermined value.

Still a further object of the invention is to provide a novel arrangement for automatically de-energizing a wire reeling motor control system when a desired amount of wire is extended or retracted.

Other objects of the present invention are to provide novel retractable fairlead constructions preventing damage to an antenna wire upon reeling in; means for automatically stopping the reel driving mechanism upon full wire retraction; and auxiliary antenna means for insuring local radio communication upon full retraction of the main wire antenna. This case is a continuation-in-part of my copending application, Serial No. 141,466, filed May 8, 1937, entitled "Antenna."

These and further objects of my invention will become apparent from the following description of preferred embodiments thereof taken in connection with the drawings, in which:

Fig. 2 is a diagrammatic electrical and mechanical representation of details of the antenna reeling system corresponding to Fig. 1.

Fig. 3 is a horizontal cross-sectional view through the remote control unit taken along the line 3—3 of Fig. 1.

Fig. 4 is an end view of a roller contacting arrangement for the antenna wire, corresponding to the view seen along the line 4—4 of Fig. 1.

Fig. 5 is a plan view of the unitary antenna reeling assembly and fairlead of Fig. 1.

Fig. 6 is a cross-sectional view through the antenna reel and associated driving arrangement as taken along the line 6—6 of Fig. 5.

Fig. 7 is a vertical cross-sectional view through the retractable fairlead and associated switching mechanism as taken along the line 7—7 of Fig. 1.

Fig. 8 is an elevational view of a modified fairlead construction.

Fig. 9 is a vertical cross-sectional view through the modified fairlead of Fig. 8.

Figure 1:
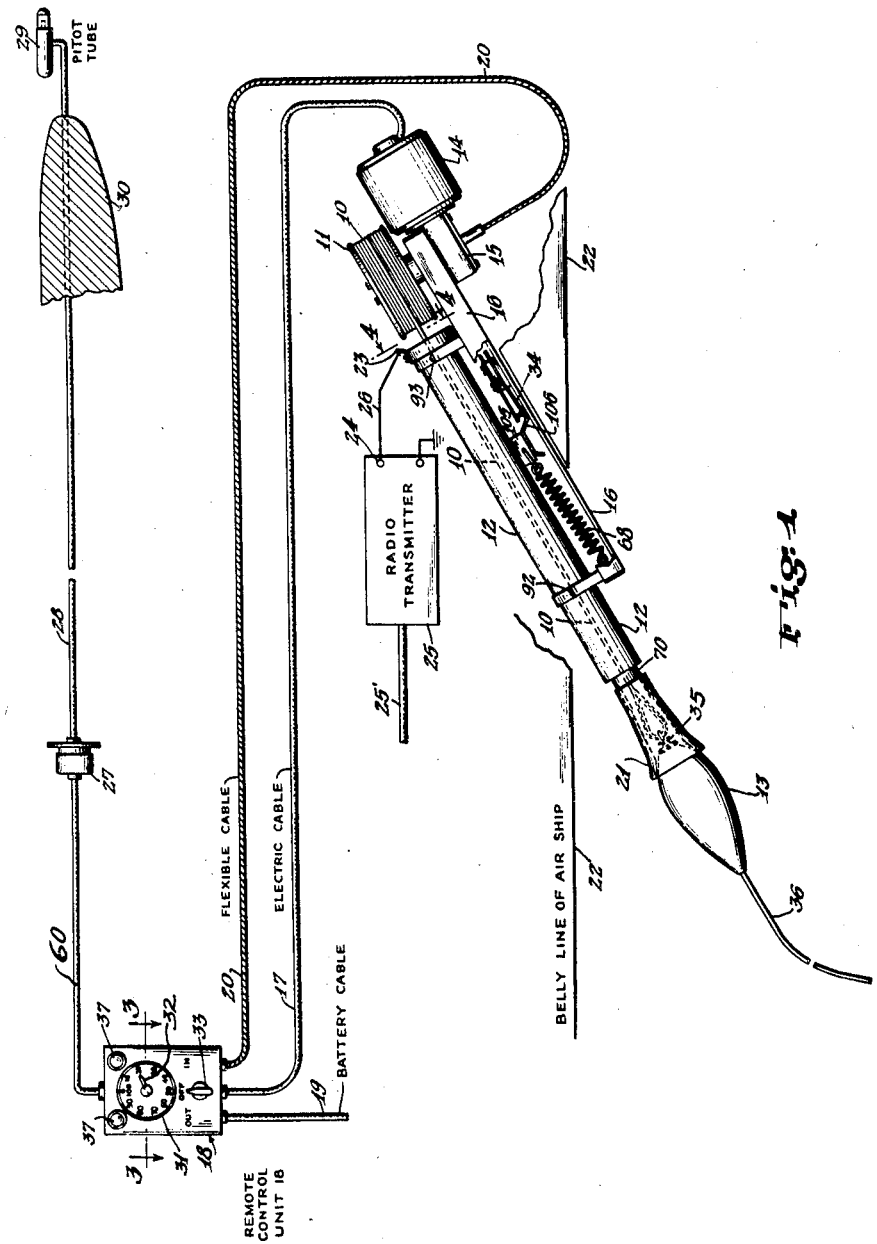
Fig. 1 is an assembled view of the components of one form of the remote antenna reeling mechanism as installed aboard an aircraft.

Figs. 10 and 11 are enlarged vertical transverse cross-sectional views of details of the fairlead as taken respectively along the lines 10—10 and 11—11 of Fig. 9.

Fig. 12 is a perspective view of a safety casing for the antenna reel.

An assembly view of a physical embodiment of the remotely controlled antenna reel of my invention is illustrated in Fig. 1. The antenna wire 10 is wound upon a reel 11 of insulating material and extends through a guide-tube or fairlead 12 to a streamline "fish" or weight 13 attached to its end. Reel 11 is mechanically connected to the electric motor 14 through a reduction gear arrangement 15 mounted upon a unitary chassis construction 16. The motor 14 is electrically connected by cable 17 to the remote control box 18 situated near the pilot. Battery cable 19 connects to a primary source of current on the aircraft. I prefer to use the standard 12 volt direct current battery for operating motor 14 and the control circuits therefor. A flexible cable 20 mechanically connects the remote control box 18 to antenna reel 11 and the reduction gearing 15. A positive control of, as well as an indication for the length of antenna wire 10 extended or retracted is made possible by flexible connection 20.

Chassis 16 supports the antenna reel and associated structure including motor 14 and reduction gearing 15 as a compact unitary mechanism. Chassis 16 is drilled with mounting holes for attachment thereof to the primary structure of the aircraft. The unit is preferably mounted with flared end section 21 projecting through tube 12, together with "fish" 13, extending through the fuselage of the aircraft as indicated by the belly line 22 of the aircraft. Antenna wire 10 is in continuous electrical connection with terminal post 23, connected to output terminal 24 of radio transmitter 25 by connection lead 26. It is to be understood that antenna 10 may be used for radio reception as well as for radio transmission.

The radio transmitter 25 is located adjacent the motor-reel unit which is located near belly line 22 of the aircraft. The radio transmitter 25 is remotely controlled or operated in a manner well known in the radio art so that it may be located remote from the control region of the plane. This arrangement permits a very short and direct connection 26 between the outlet of the transmitter 25 and the antenna reel 10. The very short connection lead 26 permits negligible radiation of the antenna signal within the aircraft structure, since the radiation occurs along the conductor connected to the high potential radio frequency output of the transmitter 25. The location of the motor-reel unit near the point of the plane through which the antenna projects facilitates the reeling-in and reeling-out operations and minimizes radio frequency energy losses.

The important advantages of my novel variable length trailing wire antenna system reside in that the pilot may adjust the trailing wire portion to obtain optimum transmission efficiency of the radio transmitter 25, and that the antenna reel 10 and projecting portions thereof are directly connected to the output terminal 24 of the radio transmitter 25 by a short connection 26 to prevent radiation losses internally in the aircraft. The radio transmitter is preferably remotely controlled from the dashboard to which it is connected by the electrical cable indicated at 25'. The remote control radio transmitter is operated by a motor and relays, not shown.

Although I prefer to operate the antenna reel 10 by the automatically operated electrical motor system illustrated in the drawings, it is to be understood that manual operation of the reel from the control position of the pilot is feasible by means of a flexible cable or torsion shaft. Such modification requires a hand lever or wheel rotatable by the pilot from the position corresponding to that of the remote control 18 shown in Fig. 1 operating upon flexible shaft or cable 20, which cable is directly geared to the antenna reel unit 10. A material advantage of the automatic over a manually operated reeling system is that the pilot is relieved of any winding duties which the manual antenna reel system would entail. Other features of my present invention, while illustrated in connection with an electrically operated system, may also be derived in conjunction with a manually operated mechanical system.

A further important feature of my invention resides in providing an automatic safety switch 27 for preventing unreeling of the trailing antenna 10 when the speed of the aircraft is less than a predetermined velocity, for example less than seventy miles per hour. Safety switch 27 is adapted to automatically actuate the motor for reeling-in and fully retracting the antenna 10 at all times except when the speed of the airplane is above the predetermined speed. Safety switch 27 is suitably connected to the motor-reel circuit and responsive to an air-pressure created by the motion of the aircraft in flight. I prefer to obtain the air pressure from the Pitot tube which is standard equipment on airplanes in conjunction with instruments for measuring various conditions of flight. The safety switch 27 can be arranged to be responsive to a pressure greater than atmospheric for actuating the safety switch relay in a manner to be hereinafter described.

Safety switch 27 is connected to air pressure tube 28 which communicates with the standard Pitot tube 29 mounted upon the wing structure 30 of the aircraft. Pitot tube 29 may be located at any suitable portion of the aircraft. It is to be understood that the differential air pressure actuating the safety switch may be generated by other means than the Pitot tube. The pressure will vary in accordance with the velocity of the aircraft. Safety switch 27 is designed to respond to a pressure which corresponds to a pressure generated at the Pitot tube or other unit connected to the air tube 28 when the ship attains the pre-determined minimum velocity, such as seventy miles per hour.

Remote control unit 18 contains a scale 31 calibrated in feet or length of antenna wire 10 extended from the reel 11. In operation, length control pointer 32 is manually turned to point to the number in feet corresponding to the length it is desired to extend antenna 10. By turning switch 33 into the "out" position, reel motor 14 will be energized to rotate in the direction to unreel antenna 10. The streamline weight or "fish" 13 serves as a drag unit to draw antenna 10 downwards and away from the ship in a manner well known in the art, giving a taut antenna structure. Flexible cable 20 is mechanically connected to control unit 18 in a manner to be described and cooperates with the setting of control pointer 32 for automatically stopping the operation of motor 14 when the pre-set length of antenna has been unreeled.

When switch 33 is turned to the "in" position, the electric motor 14 is connected to rotate in the proper sense to reel-in the extended antenna wire 10. When the antenna wire is practically reeled in, weight 13 attached to the end portion thereof abuts bell-shaped and member 21, and actuates switch 34 to open the motor circuit and prevent further reeling-in. The switch 34 is the "in-limit" switch for preventing breakage of the antenna wire 10 and for automatically stopping the motor at the proper instant. I provide a further motor cut-off means at the control box unit for independently disconnecting motor 14 as a further precaution to prevent injury to the mechanism should weight 13 be broken off and unable to operate in-limit switch 34. Weight 13 is connected to the end of antenna 10 by ball-bearing swivel joint 35 insuring free rotation of the weight and prevent its twisting off. The streamline contour of the weight 13 minimizes its aerodynamic resistance in flight.

A flexible trailing wire 36 of fixed length extends beyond the lead weight 13, and is in continuous electrical contact with antenna wire 10 through the swivel joint connection 35. Flexible trailing wire or tail 36 is preferably six to ten feet in length, so as to project beneath the aircraft and not interfere with landing or take-off operations of the airplane. Tail 36 is sufficiently long for efficient practical communication with the landing field during landing and take-off. After the plane has attained its normal flight speed, the proper length of antenna is extended depending upon the communication requirements, well known in the radio art.

Pilot lamps 37 light up on remote control unit 18 when trailing antenna wire 10 is extended, and serve as a warning that the antenna is extended. The pilot lamps 37 are automatically cut-off when the antenna 10 is completely retracted as will become evident hereinafter.

Fig. 2 is a schematic diagram showing preferred electrical and mechanical connections corresponding to the antenna reel mechanism illustrated in Fig. 1. Remote control unit 18 comprises worm gear 40 driven by worm 41 which is mechanically connected to reduction gear unit 15 by flexible cable 20. Gear 40 is rotated so as to correspond to the actual rotation of reel 11 and serves as a measure of the degree to which the wire 10 of reel 11 is extended. The gear 40 is illustrated in its normal position, corresponding to the fully retracted position of antenna 10 as shown. In this position, an insulation nib or projection 42 operates against cam switch 43 to maintain it open. A disk 44 is connected to gear 40 by means of a frictional coupling indicated at 45. Disk 44 is mechanically secured to control pointer 32. An insulated projection 46 is attached to disk 44 in a predetermined position for actuating cam switch 47.

Safety switch 27 comprises a housing 48 having a flange 49 at one end for mounting onto a suitable portion of the aircraft. A flexible diaphragm 50 is suitably supported within housing 48 and is preferably mounted to prevent air leakage around the diaphragm. The air pressure tube communicating to Pitot tube 28, 29 connects to one side of the air chamber formed by diaphragm 50 through opening 51 in flange 49. The pressure on the right side of diaphragm 50 of Fig. 2 depends upon that developed at Pitot tube 29 or other device for creating a pressure in accordance with the velocity of the aircraft as hereinabove referred to. The left air chamber within housing 48 communicates to atmospheric pressure by means of an opening to the atmosphere.

Relay contacts 52, 53 and 54 are mounted within safety switch structure 48 as schematically indicated. Double contact 53 is supported centrally on diaphragm 50. Contacts 52, 53 are open during normal pressure conditions corresponding to zero, and during zero or low flight speed of the aircraft. However, contacts 53, 54 are in contact when the speed of the airplane is below the predetermined rate or is zero. When contacts 53, 54 are in electrical contact, the motor circuit is energized to retract any extended portion of antenna 10 back upon reel 11, and conversely, prevent any unreeling of the antenna.

The unreeling or extending operation of the antenna wire 10 can occur only when contacts 52 and 53 are connected in response to the air pressure developed on the right hand chamber in the safety switch 27 as communicated from the air pressure tube 28. It is to be understood that it is feasible to operate on the vacuum side of the Pitot tube, or with a different pressure device wherein air pressure is developed in the right-hand chamber deflecting diaphragm 50 to the left and closing contact 53 upon contact 52. If a vacuum pressure is used for actuating switch 27, it is obvious that the relative position of contacts 52 and 54 will be reversed so that the deflection of the diaphragm to the right, in response to decreased pressure in the right-hand chamber will close the contacts of the circuit corresponding to 52 and 53.

In order to extend the antenna a predetermined length, the pointer 32 is turned opposite the figure on dial 31 (Fig. 1) corresponding to that length. Disk 44, being mechanically coupled with pointer 32, is angularly displaced therewith the same amount, moving projection 46 away from the cam switch 47 as shown in solid lines in Fig. 2. The dotted line position 46a of the projection is the "cut-out" position, for opening the motor circuit at cam switch 47 when the predetermined length of antenna 10 has been unreeled or extended as will be hereinafter described. The displacement of projection 46 and pointer 32 shown in Fig. 2 represents about one-fifth of a revolution for disk 44 and corresponds to approximately one-fifth of the antenna to be extended. If, for example, the length of the extensible antenna is one hundred feet, such setting will correspond to about twenty feet as marked on dial 31 shown in Fig. 1. Cam switch 47 is permitted to close by the displacement of projection 46, and the "out" circuit is completed through relay 56 as follows:

A series circuit extends from switch 47 through connection lead 55 to "out" relay 56 and ground. The other side of cam switch 47 is connected to in-out switch 33 through connection lead 57 and continues from switch 33 through connection lead 58 through closed safety switch contacts 52, 53 back through connection lead 59 of Pitot switch cable 60 to the ungrounded terminal of battery 61. Battery 61 is preferably the standard direct current battery of the airship, or any other suitable voltage source for actuating motor 14 and the associated relay circuits. Summarizing, cam switch 47 is closed after pointer 32 is displaced to a reeling-out position, connecting battery 61 in series with "out" relay 56 when in-out switch 33 is connected to the "out" position, and when safety switch contacts 52, 53 are in contact under flight conditions.

When "out" relay 56 is energized, its armature circuits 62 and 63 are closed and accordingly directly connect armature 64 and series field winding 65 of reel-motor 14 across battery 61. Motor 14 is illustrated as a series motor which operates on direct current from battery 61. The sense of rotation of motor 14 depends upon the relative connection of series field 65 with respect to armature 64 as is well known in the electrical art. By-pass condenser 66 is preferably connected across armature 64 to suppress high frequency currents which might be generated by motor commutation. When "out" relay 56 is energized, reel motor 14 is accordingly energized to rotate in the predetermined direction corresponding to the reeling-out of antenna wire 10.

Armature 64 of motor 14 is directly coupled to reduction gearing 15 by coupling member indicated at 67 and drives reel 11 at a predetermined rate. When antenna 10 is "let-out" or unreeled, "fish" or weight 13 holds the wire taut. When weight 13 is released from bell end 21 of slidable tube 70, it permits spring 68 to draw tube 70 out and close contacts 34 of the in-limit switch.

When switch contacts 34 are closed, a circuit is completed through connection leads 71 and 72 to the signal or pilot lamps 37 which are connected in parallel, back through connection lead 73 and to battery 61. Switch 34 accordingly completes the pilot light circuit which flashes an indication on remote control unit 18 that some portion of the antenna is extended. When the antenna is retracted, weight 13 abuts flared end 21 of sleeve 70 against the action of the spring 68, and opens switch 34. The circuit to indicator lights 37 is then opened and the pilot is apprised that the antenna is fully retracted. By the term "fully retracted" I mean that the extensible portion of antenna 10 is substantially fully drawn "in" to the position as shown in the drawings. The tail or flexible appendage 36, useful for short distance communication, remains extended in the preferred design of the antenna reel mechanism. The opening of switch contacts 34 also opens the circuit of motor 14 if it is still in circuit connection. When weight 13 moves against the flared sleeve 21 the antenna wire is prevented from snapping or breaking.

Antenna 10 is unreeled by positive motivation of motor 14 when the mechanism is connected to the "out" position, as shown in Fig. 2. The rotation of reel 11 correspondingly rotates worm 41 through flexible cable 20 and drives worm gear 40 in a counter-clockwise direction. The rotation of worm gear 40 moves disk 44 counter-clockwise due to the frictional coupling 45 therebetween. Accordingly, as antenna 10 is extended, projection 46 is rotated counter-clockwise back towards its original dotted line position 46a.

When projection 46 reaches the position 46a, cam switch 47 is opened to disconnect motor 14 and discontinue the unreeling operation. The angular movement of gear 40 and disk 44 is preferably calibrated to correspond with the actual length of antenna extended during the reeling operation. The effect of projection 46 is to disconnect the motor circuit after disk 44 has rotated an amount corresponding to the calibrated displacement thereof, twenty feet in the present example. Projection 42 on worm gear 40 is moved to the dotted position 42a, electrically closing cam switch 43 to the dotted position 43a.

The reeling-in or retracting operation of the antenna 10 is accomplished by connecting switch 33 to the "in" contact. Cam switch 43, being closed in dotted position 43a, causes "in" relay 75 to be energized since the following series circuit is completed: lead 76 to relay 75, to contacts 34 (which are closed when antenna 10 is extended), to ground, through battery 61, to cable lead 77, back through connection lead 59, across safety switch contacts 52, 53, to switch 33 through lead 58, back to cam switch 43 and to the closed dotted line position 33a of the in-out switch.

Energization of in-relay 75 attracts its armatures 78 and 79 to close the circuit of motor 14 through battery 61 to cause it to rotate in the opposite direction to that when armatures 62 and 63 are closed by the "out" relay. Reel 11 is accordingly rotated to retract antenna 10 until weight 13 abuts sleeve 70 at the flared end 21 and opens in-limit switch contacts 34. The "in" relay 75 is then immediately deenergized, opening the motor circuit.

During the retracting operation flexible cable 20 correspondingly rotates worm gear 40 in a clockwise direction, bringing projection 42 to its original position, shown in solid lines, to open cam switch 43. Opening of cam switch 43 by projection 42 may not occur simultaneously with the opening of the in-limit switch 34. However, switch 34 is the safety means for insuring proper opening of the reeling-in circuit since it is the positive indication of complete retraction of antenna 10. Projection 42 serves as a check for opening the motor circuit in time should weight 13 be lost or otherwise fail to function, preventing continuous and high-speed reeling of the system at that time.

The frictional engagement between disk 44 and gear 40 moves projection 46 from position 46*a* corresponding to an extended position of disk 44 when pointer 32 is displaced, back to its original position 46 when the antenna is fully retracted. To again extend the antenna to the same degree corresponding to the position of pointer 32, it is merely necessary to reconnect switch 33 to the "out" position. To extend the antenna a different amount, it is merely necessary to shift pointer 32 to the position opposite the length to be extended as marked on dial 31 and the apparatus will function to extend the wire the new amount. The reeling-out operation of the antenna system of the illustrated embodiment can occur only when safety switch 27 is actuated by a predetermined pressure in the air pressure tube 28 to close contacts 52, 53. Means may be provided to short-circuit the action of switch 27, or it may be eliminated.

Should the speed of the plane fall below the predetermined speed so that diaphragm 50 moves towards the right to open contacts 52, 53, any reeling-out operation becomes ineffective through the normal control at switch 33. Relay contacts 53, 54 are closed when the speed of the plane is sufficiently reduced, closing the retracting or reeling-in circuit through leads 59 and 60, by short-circuiting in-out switch 33 to the "in" position. The effect of the reduced speed of the aircraft is to automatically throw in-relay 75 into circuit since cam switch 43 will be normally closed to position 43*a* if any of the antenna 10 is extended. Energization of relay 75 operates motor 14 to rotate reel 11 to retract antenna 10 until weight 13 abuts sleeve 70 and opens in-limit switch 34. The motor circuit is then immediately disconnected from battery 61 and the antenna is safely retracted for landing operations of the plane. The warning lamps 37 are continuously in circuit and light up while antenna 10 is extended to any degree and in-limit switch is closed.

Fig. 3 is a cross-sectional view taken horizontally through remote control unit 18 along line 3—3 of Fig. 1. The housing 81 is cast with a boss 82 for supporting worm 41, and a bearing 84 for supporting control disk 44 and worm gear 40. A back plate 83 is screwed onto housing 81 and may contain holes for mounting the unit 18 onto the aircraft structure. Worm 41 meshes with the worm gear 40. Worm gear 40 is attached to sleeve 85 coaxial about rod 86. Sleeve 85 is closely fitted about rod 86 to form a frictional engagement therewith. Dial 31 is peened onto a shoulder at the end of sleeve 85 and accordingly rotates directly with gear 40. The selective length control pointer is secured to knob 87 which is manually operated in the manner already described.

Pointer 32 and knob 87 are mechanically connected to control disk 44 by means of central rod 86; knob 87 being peened onto the rod 86, and disk 44 secured to rod 86 by set-screw 89. A spring 90 concentric with rod 86 and located within a cavity in knob 87 mechanically biases disk 44 against a spacer or composition washer 91 towards worm gear 40. Disk 44 is accordingly frictionally engaged with worm gear 40 and is rotated therewith. The positive engagement of gear 40 with worm gear 41 permits disk 44 and knob 87 to be manually displaced independently of the worm gear 40 and to perform the selective length control functions hereinabove described in connection with diagrammatic Fig. 2.

Fig. 4 is an end view of the continuous antenna contact means as viewed from the line 4—4 in Fig. 1. Guide-tube 12 is shown supported on insulation block 104 by strap 93. Block 104 is attached to the common chassis 16. The edges of chassis 16 are curled over to stiffen and strengthen the chassis. Antenna wire 10 is in continuous electrical and frictional contact with the tubular rollers 110 spaced by a distance equal to the diameter of the wire 10. Rollers 110 are supported by metallic brackets 111 and 112 and are electrically interconnected therewith. A terminal post 23 is connected to the top bracket 112. The wire 26 connecting to radio transmitter 25, as shown in Fig. 1, is accordingly conductively connected to the antenna wire 10 as will now be evident. Continuous electrical contact is maintained for the variable length of the extended antenna. There is no danger of short-circuiting antenna 10 to ground since should it be displaced from the central position it could only touch upon insulation guide-tube 12. By leading antenna wire 10 at an angle to the central position of the wire in tube 12, in a manner illustrated in Fig. 5, increased frictional contact occurs at one of the rollers 110.

Fig. 5 is a plan view of the motor-reel assembly as a unitary structure with chassis 16. Chassis 16 is preferably of metallic material and contains mounting brackets 92 and 93 for securing the fairlead or sleeve 12 in position. Movable or retractible sleeve 70 is slidable within sleeve 12 and contains flared end 21. Sleeves 70 and 12 are made of insulation material such as Bakelite or composition to prevent short-circuiting of antenna wire 10 to ground through chassis 16. Flared end 21 is preferably of metallic construction, such as steel, to resist shock and wear resulting from impacts by the weight 13. Reel 11 is rotatably supported on rod 94 adjacent the right end of the sleeve structure 12. Motor 14 is secured to chassis 16 at the extreme right end, cooperating with the reduction gear structure (not seen in Fig. 5). Remotely controlled relays 56 and 75 are enclosed in housing 39.

The preferred physical cooperation between reel 11 and reduction gearing 15 is illustrated in cross-sectional view Fig. 6, taken along the line 6—6 of Fig. 5. The shaft of motor 14 is coupled to worm 95 within reduction gearing unit 15. A worm gear 96 meshes with worm 95 and is keyed to shaft 94 secured to reel structure 11. Flexible cable 20 is mechanically coupled to shaft 94 by female coupling member 97 containing a socket cooperating with projection 98 of shaft 94. Flexible cable 20 and its connecting head 97 is maintained in position by sleeve 99 set into extension 100 of reduction gearing 15. Antenna reel 11 comprises parallel disks 101, 102 of insulation material suitably spaced to contain antenna wire 10 therebetween. The antenna is insulated from the metallic structure of the motor drive as well as the supporting structure.

Fig. 7 is a cross-sectional view illustrating one embodiment of the in-limit switch and associated actuation arrangement as taken along the line 7—7 of Fig. 5. Outer tubular sleeve 12 is fixedly supported upon chassis 16 by straps 92, 93 and insulation blocks 103, 104. Movable sleeve 70 is slidably mounted within sleeve 12. Flared metallic member 21 is secured to the outer end of slidable tube 70. A block 105 is attached to a portion of slidable tube 70 for actuating extended arm 106' of in-limit switch 34.

To facilitate mounting of block 105 on tube 70, I provide a slot 114 in tube 70 located directly above the position of block 105, and a further corresponding slot 115 in outer tube 12. When retractable tube 70 is in the extended position corresponding to that shown in Fig. 5, both slots 114 and 115 are lined-up and permit the insertion of a screw driver or other suitable tool for mounting block 105. Simple holes may be substituted for the slots 114, 115. Outer slot 115 on tube 12 is covered over by a plate 116, such as a name plate, to prevent foreign matter from entering the assembly.

Block 105 accordingly is slidable with tube 70 and projects through a slot 106 on the bottom portion of the fixed sleeve 12. Spring 68 mechanically biases block 105 towards the left and with it slidable tube 70 as well. The normal position of tube 70 is the extended one as shown in Fig. 5, holding switch block 105 against the left end of the slot 106, away from arm 106' of switch 34.

When antenna 10 is fully retracted, weight 13 is drawn against the open end of the end member 21, forcing tube 70 inwards against spring 68 and operating block 105 to the position illustrated in Fig. 7. Blade 106' is pressed downwards, opening the contacts of in-limit switch 34. Conversely, when antenna 10 is extended, spring 68 moves block 105 away from switch 106', effecting a closure of the contacts of switch 34. Pilot lights 37 are then lit up, and the reeling operation disclosed in connection with Figs. 1 and 2 is permitted to take place. Antenna 10 is in continuous contact with rollers 110 connecting with the radio transmitter 25 by the short connection lead 26 as hereinabove described in connection with Fig. 1.

An important advantage of the spring biased retractable tube 70 is that antenna wire 10 is kept taut when the antenna is completely retracted and the motor is disconnected when holding weight 13 firmly against flared end 21. In practice, tube 70 is made retractable to the extent of several inches. Reel 11 is prevented from unwinding when motor 14 is not operating, due to the mechanical interlocking of worm gear 96 with worm 95, as shown in Fig. 6. With weight 13 against flared end 21, tube 70 is forced inwards against spring 68, maintaining antenna 10 taut after the motor circuit is disconnected. The practical advantages resulting are that weight 13 is prevented from vibrating or chattering against nearby objects when the antenna is retracted, and a firm electrical connection between the tail 36 and the radio transmitter effected. Antenna tail 36 remains extended for local radio communication.

The safety switch 27 has been illustrated as electrically connected in the motor control circuit to prevent the extension of the antenna 10 before the plane has reached a predetermined speed and to automatically retract the antenna should any of it be extended when the aircraft is flying below the predetermined speed. My invention, however, may be practiced without the use of a safety switch by merely connecting the remote control unit directly to the motor circuit relays as will be evident to those skilled in the art.

A modified form of the fairlead is illustrated in Figs. 8 to 11. Fig. 8 is an end view of the fairlead, in extended position. Two concentric tubes 120 and 121 coact in a manner similar to tubes 12 and 70 of the previously described embodiment. Outer tube 120 is fixedly mounted on the chassis or another desired base by metal straps 122 and bolts 123. The streamlined weight or fish 125 is coupled by swivel joint 126 to loop end 127 of reelable antenna wire 130. Antenna wire 130 extends within concentric tubes 120 and 121.

Projecting antenna portion 128 from fish 125 corresponds to the high frequency communication antenna portion 36 of the previous embodiment. The in-limit switch 131 corresponds to in-limit switch 34 of the previous embodiment. In the present form it comprises a toggle switch. Arm 132 of toggle switch 131 is in a Y-form having projections 133 and 134 extending through tube 120 to coact with slidable tube 121. Electrical connections 135 for the motor control circuits are made to the terminals of in-limit switch 131, corresponding to the connections with switch 34 shown in Fig. 2.

Fig. 9 is a vertical cross-sectional view through the modified fairlead construction, with antenna wire 130 and fish 125 in the fully retracted position. Fish 125 abuts against a flared or tapered opening of metallic end member 136 affixed to the end of slidable composition tube 121. A spring 137 is contained within composition tube 120, positioned between the right end of tube 121 and metallic insert 138 on the corresponding end of tube 120. Spring 137 is a compression spring arranged to continually mechanically bias tube 121 outwardly from tube 120.

The relatively short antenna section 128 projects centrally through streamlined weight 125 and is conductively related with swivel connection 126 at the end of the weight. Reelable antenna wire 130 is mechanically connected with swivel joint 126 through looped end 127 of wire 130. When main antenna wire 130 is fully reeled-in to the position shown in Fig. 9, streamlined weight 125 abuts end member 136 forcing slidable tube 121 inwardly to tube 120 and rendering wire 130 taut. A firm mechanical and therefore electrical interconnection is thus made through swivel joint 126 between looped end 127 of antenna 130 and antenna section 128 when antenna 130 is fully reeled-in.

The reelable antenna wire 130 and the radio transmitter (or receiver) are in continuous electrical connection, such as by a sliding or roller contact means (similar to roller connections 110 of Fig. 4) or other suitable means. The tail antenna 128 is used for local radio communication when the main antenna wire 130 is fully reeled-in. The taut relation between swivel 126 and the looped end 127 insures an efficient electrical connection of tail antenna 128 with the radio transmitter (or receiver) in the aircraft. Radio communication is thus carried on without danger of a long projecting antenna wire during landing or take-off maneuvers, as set forth hereinabove.

Slidable tube 121 is held again rotation or angular displacement with respect to fixed tube 120 by bolt-head 140 coacting with longitudinal slot or groove 141 in tube 121. Enlarged cross-sectional Fig. 10, taken along the line 10—10 of Fig.

9, more clearly illustrates the coaction of head 140 of bolt 142 with groove 141. Bolts 142 and 143 secure the extended end of bracket 145 with fixed sleeve 120. Bracket 145 holds toggle switch 131 in fixed position on sleeve 120. The opposite end of bracket 145 is secured to tube 120 by bolt 146 as shown in Fig. 9.

Longitudinal groove 141 is aligned with arms 133, 134 of toggle switch 131 extending therewithin. Toggle switch 131 is actuated in accordance with the "in" and "out" positions of tube 121 with respect to tube 120. A ring 147, secured in circular groove 149 of tube 121, coacts with arms 133, 134 of in-limit toggle switch 131. By aligning extending arms 133, 134 of switch 131 within groove 141, abutting member 147 need not project beyond the outer surface of slidable tube 121. The surface of member 147 is flush with the surface of tube 121, and does not interfere with the sliding of the tube. Fig. 11 is an enlarged cross-sectional view taken along the line 11—11 of Fig. 9 through the ring 147 and coacting elements. Ring 147 is shown semi-circular and secured to tube 121 by pin 148.

When tube 121 is moved to the retracted position shown in Fig. 9, on reeling-in of wire 130, member 147 abuts extending arm 134 of toggle switch 131, moving it to open switch 131 and deenergizing the motor control circuit in the manner previously described to prevent further reeling of wire 130. This serves as a safety in-limit feature. When the wire 130 is reeled-out, it is no longer taut and compression spring 137 extends movable sleeve 121 from sleeve 120 as shown in Fig. 8. As tube 120 is moved outwardly by spring 137, member 147 is moved against extending toggle switch arm 133 to electrically close toggle switch 131. This action reconnects the in-limit circuit through switch 131, corresponding to the safety in-limit circuit including switch 34 through in-relay 75 shown in Fig. 2.

In Fig. 12, I illustrate a fixed enclosure 150 for the rotatable antenna reel 11 to prevent damage to the aircraft should the antenna wire 130 for any reason break or snap. Heretofore, if the reelable antenna broke, the dangling wire end extended beyond the reel while it rotated, causing damage to adjacent aircraft portions. By providing safety casing 150 coacting with but not interfering with the operations of reel 11, this danger is eliminated. The diameter of casing 150 is slightly larger than that of reel 11, providing an annular space 155 therebetween to permit free rotation of the reel. Reel 11 is driven through shaft 94 by the motor controls as previously explained in connection with Figs. 5 and 6.

The safety casing 150 is fixedly mounted to the chassis or other suitable base by bracket 151. The ends of bracket 151 are secured to circular casing 150 by rivets 152, or other suitable means. Holes 153 in the bracket provide for its connection with a base or chassis. A wide opening 154 in the side of safety casing 150 permits antenna wire 130 to be reeled by the encased reel 11. Casing 150 may be tubular and of equal width with reel 11. A rear wall portion is preferably added to casing 150, not shown in the perspective Fig. 12. The reel 11 is readily assembled with safety casing 150.

Although I have described preferred arrangements for carrying out my present invention, it is to be understood that modifications thereof are feasible without departing from the broader spirit and scope thereof, and accordingly I do not intend to be limited except as set forth in the following claims.

What I claim is:

1. An antenna system for an aircraft comprising a reel containing an antenna wire; a motor for operating said reel; retracting means including circuit connections to said motor for energizing said motor to reel-in extended antenna wire; and means for limiting the reeling-in of said wire comprising a protuberance secured to the wire, an insulation tube through which said wire passes having a switch operating portion, a switch circuitally connected with said retracting means and operable by said tube portion, whereby said tube is abutted by said protuberance and displaced to operate said switch to deenergize said motor.

2. An antenna system for an aircraft comprising a reel containing an antenna wire; a motor for operating said reel; retracting means including circuit connections to said motor for energizing said motor to reel-in extended antenna wire; and means for limiting the reeling-in of said wire comprising a weight secured to the wire, an insulation tube concentric about the wire, a spring normally biasing said tube in the direction opposite the retracting direction, a switch circuitally connected with said retracting means and mechanically operable by said tube, whereby said biased tube is abutted by said weight and displaced to operate said switch to deenergize said motor and stop the wire retraction, and to press said weight to hold the wire end taut while retracted.

3. An antenna system for an aircraft comprising a reel containing an antenna wire; a motor for operating said reel; retracting means including circuit connections to said motor for energizing said motor to reel-in extended antenna wire; and means for limiting the reeling-in of said wire comprising an element secured to the wire, a slidable tube having a flared end through which said wire passes, a switch circuitally connected with said retracting means and mechanically operable by said tube, a spring for biasing said tube towards the extended position to operate said switch in a predetermined relation, whereby said biased tube is abutted by said element and displaced to operate said switch to deenergize said motor.

4. An antenna system for an aircraft comprising a reel containing an antenna wire; a motor for operating said reel; retracting means including circuit connections to said motor for energizing said motor to reel-in extended antenna wire; and means for limiting the reeling-in of said wire comprising a protuberance secured to the wire, a movable member, a switch circuitally connected with said retracting means and having a Y-arm mechanically operable by said member, a spring for biasing said member towards the extended position to operate said switch in a predetermined relation, whereby said biased member is abutted by said protuberance and displaced to operate said switch to deenergize said motor.

5. An antenna system for an aircraft comprising a reel containing an antenna wire; a motor for operating said reel; means including circuit connections to said motor for extending a variable length of said wire and for stopping said motor when a predetermined length of said wire is extended; retracting means including circuit connections to said motor for energizing said motor to reel-in extended antenna wire; and means for limiting the reeling-in of said wire comprising a protuberance secured to the wire, a member, a switch circuitally connected with said retracting means and operable by said member, whereby said member is abutted by said protuberance and displaced to operate said switch to deenergize said motor and stop the wire retraction.

6. An antenna system for an aircraft comprising a reel containing an antenna wire; a motor for operating said reel; means including circuit connections to said motor for extending a variable length of said wire and for stopping said motor when a predetermined length of said wire is extended; retracting means including circuit connections to said motor for energizing said motor to reel-in extended antenna wire; and means for limiting the reeling-in of said wire comprising a weight secured to the wire, a slidable tube having a flared end through which said wire passes, a switch circuitally connected with said retracting means and mechanically operable by said tube, a spring for biasing said tube towards the extended position to normally maintain said switch closed, whereby said biased tube is abutted by said weight and displaced to open said switch to deenergize said motor.

7. An antenna system for an aircraft comprising a reel containing an antenna wire; a motor for operating said reel; means including circuit connections to said motor for extending a variable length of said wire and for stopping said motor when a predetermined length of said wire is extended; retracting means including circuit connections to said motor for energizing said motor to reel-in extended antenna wire; and means for limiting the reeling-in of said wire comprising an element secured to the wire, a spring biased tube through which said wire passes, a switch circuitally connected with said retracting means and having a Y-arm mechanically operably by said tube, whereby said biased tube normally operates said switch into circuit closing position and is abutted by said element and displaced to operate said switch to deenergize said motor and stop the wire retraction.

8. The combination with a wire reeling system of mechanism for guiding said wire comprising a first tube through which said wire is moved, a second tube slidable with said first tube and having an end portion projecting beyond said first tube in the wire extending direction for abutting a protuberance on said wire when said wire is fully retracted; and a spring arranged to mechanically bias apart said first and second tubes whereby impact of said protuberance on said projecting tube end is cushioned and said wire is held taut in the retracted position.

9. Guiding mechanism for an extensible wire comprising a first tube through which the wire is moved, a second tube slidable with respect to said first tube and having an end portion projecting beyond said first tube arranged for abutting a protuberance on said wire, an electrical switch mounted on said mechanism, and a member secured on said second tube for operating said switch to a predetermined position when said second tube is moved with respect to said first tube as said protuberance abuts the projecting end portion of said second tube.

10. A fairlead for an extensible antenna wire comprising a first tube through which the wire is moved, a second tube slidable within said first tube and having a flared end portion projecting beyond said first tube arranged for abutting a protuberance on said wire, an electrical switch mounted on said first tube, a member secured on said second tube for operating said switch in a predetermined manner when said second tube is moved with respect to said first tube as the protuberance abuts the projecting end portion of said second tube, and spring means for normally biasing said second tube in the wire extending direction.

11. Guiding mechanism for an extensible wire antenna comprising a first tube through which the wire is moved, a second tube slidable with respect to said first tube and having an end portion projecting beyond said first tube arranged for abutting a protuberance on said wire, an electric switch on said mechanism; a member secured on said second tube for operating said switching mechanism to a predetermined position when said second tube is moved with respect to said first tube as the protuberance abuts said projecting end portion, and metallic roller means secured to said first tube arranged in a continuously contacting relation with said extensible wire antenna.

12. Guiding mechanism for an extensible wire antenna comprising a first tube through which the wire is moved, a second tube slidable with respect to said first tube and having an end portion projecting beyond said first tube arranged for abutting a protuberance on said wire, a toggle switch on said mechanism having a Y-arm extending into coaction with said second tube, and a member secured on said second tube for operating said Y-arm to a predetermined position when said second tube is moved with respect to said first tube as the protuberance abuts said projecting end portion.

13. A fairlead for an extensible wire antenna comprising a first tube through which the wire is moved, a second tube longitudinally slidable with respect to said first tube and having an end portion projecting beyond said first tube arranged for abutting a protuberance on said wire, a toggle switch mounted on said first tube and having a Y-arm extending through a slot in said first tube into coaction with said second tube, and a member secured on said second tube for operating said Y-arm to a predetermined position when said second tube is moved with respect to said first tube as the protuberance abuts said projecting end portion.

14. A fairlead for an extensible wire antenna comprising a first tube through which the wire is moved, a second tube longitudinally slidable with respect to said first tube and having an end portion projecting beyond said first tube arranged for abutting a protuberance on said wire, a switch mounted on said first tube and having an arm extending through said first tube into coaction with a longitudinal groove on said second tube, and a member secured on said second tube across a part of said groove for operating said arm to a predetermined position when said second tube is moved with respect to said first tube as the protuberance abuts said projecting end portion.

15. A fairlead for an extensible wire antenna comprising a first tube through which the wire is moved, a second tube longitudinally slidable with respect to said first tube and having an end portion projecting beyond said first tube arranged for abutting a protuberance on said wire, a toggle switch mounted on said first tube and having a Y-arm extending through a slot in said first tube into a longitudinal groove on said second tube, and a member secured on said second tube across a part of said groove for operating said Y-arm to a predetermined position when said second tube is moved with respect to said first tube as the protuberance abuts said projecting end portion.

16. A unitary antenna reeling system comprising a reel containing an antenna wire; a motor for driving said reel in either direction; a retractable fairlead having two concentric tubes mechanically biased apart for guiding said wire centrally therethrough; a chassis for mounting said motor, reel and fairlead in mechanically cooperative relationship; and a protuberance connected at the outside end of said wire arranged to abut the outer end of said fairlead and compress said tubes together for maintaining said wire taut when fully retracted and prevent rattling thereof.

17. A unitary antenna reeling system comprising a reel containing an antenna wire; a motor for driving said reel in either direction; a retractable fairlead having two concentric tubes mechanically biased apart for guiding said wire centrally therethrough, one of said tubes normally projecting beyond the other in the wire extending direction; a chassis for mounting said motor, reel and fairlead in mechanically cooperative relationship; a protuberance connected at the outside end of said wire arranged to abut said projecting tube end of said fairlead and compress said tubes together for maintaining said wire taut when fully retracted and prevent rattling thereof; and a casing secured with said chassis and extending directly over the open annular portion of said reel to enclose said contained wire and protect adjacent structures from said wire.

18. An antenna system for an aircraft comprising a reel containing a main antenna wire; mechanism for operating said reel to extend and retract said main wire with respect to the aircraft; a protuberance on the end of said main wire; means for abutting said protuberance when said wire is substantially fully retracted, arranged for stopping the retracting operation of said reel; and a relatively short auxiliary antenna wire electrically related with said main wire end and extending from said protuberance outside of said aircraft, whereby said auxiliary antenna wire permits efficient short range radio communication when said main antenna is retracted, preventing physical interference with the aircraft during landing and take-off maneuvers.

19. An antenna system for an aircraft comprising a reel containing a main antenna wire; mechanism for operating said reel to extend and retract said main wire with respect to the aircraft; a protuberance mechanically linked to the end of said main wire; a swivel joint connecting said protuberance with said main wire end; means for abutting said protuberance when said wire is substantially fully retracted, arranged for stopping the retracting operation of said reel; and a relatively short auxiliary antenna wire electrically related with said main wire end across said swivel joint and extending outside of said aircraft, whereby said auxiliary antenna wire permits efficient short range radio communication when said main antenna is retracted, preventing physical interference with the aircraft during landing and take-off maneuvers.

20. An antenna system for an aircraft comprising a reel containing a main antenna wire; mechanism for operating said reel to extend and retract said main wire with respect to the aircraft; a protuberance on the end of said main wire; a swivel joint connecting said protuberance with said main wire end; means for abutting said protuberance when said wire is substantially fully retracted, arranged for stopping the retracting operation of said reel; and a relatively short auxiliary antenna wire extending through said protuberance, electrically related with said main wire end across said swivel joint and extending outside of said aircraft; and means for maintaining said main antenna wire taut with respect to said protuberance, across said swivel joint, when said main antenna is retracted; whereby said auxiliary antenna wire permits efficient short range radio communication when said main antenna is retracted, preventing physical interference with the aircraft during landing and take-off maneuvers.

WILLIAM P. LEAR.